US010049379B2

(12) United States Patent
Zazza et al.

(10) Patent No.: US 10,049,379 B2
(45) Date of Patent: Aug. 14, 2018

(54) QUANTITATIVE BRANDING ANALYSIS

(75) Inventors: Frank Zazza, New Rochelle, NY (US); Boris Vychodil, Portland, OR (US)

(73) Assignee: Rentrak Corporation, Portland, OR (US)

( * ) Notice: Subject to any disclaimer, the term of this patent is extended or adjusted under 35 U.S.C. 154(b) by 605 days.

(21) Appl. No.: 12/814,453

(22) Filed: Jun. 12, 2010

(65) Prior Publication Data

US 2010/0318406 A1 Dec. 16, 2010

Related U.S. Application Data

(60) Provisional application No. 61/313,511, filed on Mar. 12, 2010, provisional application No. 61/186,764, filed on Jun. 12, 2009.

(51) Int. Cl.
G06Q 30/02 (2012.01)
H04N 21/4725 (2011.01)
H04N 21/81 (2011.01)

(52) U.S. Cl.
CPC ......... *G06Q 30/0243* (2013.01); *G06Q 30/02* (2013.01); *H04N 21/4725* (2013.01); *H04N 21/812* (2013.01)

(58) Field of Classification Search
None
See application file for complete search history.

(56) References Cited

U.S. PATENT DOCUMENTS

| 6,006,257 A | 12/1999 | Slezak |
| 6,205,231 B1 | 3/2001 | Isadore-Barreca et al. |
| 6,698,020 B1 | 2/2004 | Zigmond et al. |
| 7,306,522 B2 | 12/2007 | Silver et al. |
| 7,313,808 B1 | 12/2007 | Gupta et al. |
| 2001/0013125 A1 | 8/2001 | Kitsukawa et al. |
| 2001/0049820 A1 | 12/2001 | Barton |
| 2002/0013943 A1 | 1/2002 | Haberman et al. |
| 2002/0056094 A1 | 5/2002 | Dureau |
| 2002/0124263 A1 | 9/2002 | Yokomizo |
| 2002/0138831 A1 | 9/2002 | Wachtfogel et al. |
| 2002/0141491 A1* | 10/2002 | Corts et al. ............. 375/216 |
| 2002/0162117 A1 | 10/2002 | Pearson et al. |
| 2002/0178447 A1 | 11/2002 | Plotnick et al. |
| 2002/0184047 A1 | 12/2002 | Plotnick et al. |
| 2002/0188943 A1 | 12/2002 | Freeman et al. |
| 2003/0069822 A1 | 4/2003 | Ito et al. |
| 2003/0070167 A1 | 4/2003 | Holtz et al. |
| 2003/0074661 A1 | 4/2003 | Krapf et al. |
| 2004/0205810 A1 | 10/2004 | Matheny et al. |
| 2005/0108082 A1 | 5/2005 | Jenkinson |
| 2005/0273722 A1* | 12/2005 | Robb et al. ............. 715/764 |

(Continued)

OTHER PUBLICATIONS

Havlena et al., "Measuring Magazine Advertising Effectiveness and Synergies", Worldwide Readership Research Symposium 2007, Session 5, Paper 25, pp. 233-242.*

*Primary Examiner* — Thomas L Mansfield

(74) *Attorney, Agent, or Firm* — Baker & Hostetler LLP

(57) ABSTRACT

A method and system for analysis and evaluation of branding of commercial products embedded in entertainment programming. The entertainment programming may be divided into blocks that are compared to several rule sets defining audio visual and other attributes of the commercial products to evaluate parameters such as recall of the product by viewers.

16 Claims, 11 Drawing Sheets

(56) References Cited

U.S. PATENT DOCUMENTS

| | | |
|---|---|---|
| 2005/0273828 A1 | 12/2005 | Barton |
| 2006/0020506 A1 | 1/2006 | Axe et al. |
| 2006/0200253 A1* | 9/2006 | Hoffberg ............... G05B 15/02 |
| | | 700/19 |
| 2007/0156521 A1 | 7/2007 | Yates |
| 2007/0261072 A1 | 11/2007 | Boulet et al. |
| 2008/0010659 A1 | 1/2008 | Zenith |
| 2008/0077956 A1 | 3/2008 | Morrison et al. |
| 2008/0115161 A1 | 5/2008 | Kurzion |
| 2008/0235077 A1 | 9/2008 | Harkness et al. |
| 2009/0064219 A1 | 3/2009 | Minor |
| 2010/0306242 A1* | 12/2010 | Chow ........................ 707/769 |

* cited by examiner

QUANTITATIVE BRANDING ANALYSIS

RELATED APPLICATIONS

This application claims priority to U.S. Provisional Application Ser. No. 61/313,511 filed Mar. 22, 2010 titled "Quantitative Branding Analysis" and U.S. Provisional Application Ser. No. 61/186,764 filed Jun. 12, 2009 titled "Enhanced Viewer Interaction for Programming" which are hereby incorporated by reference in their entirety for all purposes.

BACKGROUND

This application relates to branding and product placement in programming delivered to viewers and more specifically to methods and systems for determining the value of embedding a commercial product in an entertainment segment.

Examples of branding systems are disclosed in U.S. Patent Publication Nos. US20080235077; US20030069822; US20050108082 and US20060020506 which are hereby incorporated by reference in their entirety for all purposes.

SUMMARY

Advertising has been an inherent part of commerce since the first sign was put over a shop door. Today print radio, television and the internet are used to reach the widest possible consumer base. Understanding the number and type of consumers specific advertising has reached and the number of times it reached them has been a concern to the marketer from the beginning.

While advertising is a mainstay of any market based economy, in recent years brand placement has become an industry of its own. Brand placement may be considered advertising that is part of the programming rather than a commercial segment separate from and sequential with the entertainment or broadcast programming. A logo appearing in the scene background or a movie star holding a can of cola has gone from the responsibility of the prop department to a boardroom driven commodity.

Evaluating and quantifying the value of this branding using a computer with a computer processor may be important to those producing the entertainment programming and the marketers and distributors of the products. The value of a screen character holding a bottle of wine and a filled glass discussing how good the wine is may be deemed as more valuable than having a logo in the background which is partially obscured. An evaluation or classification system for measuring a complete set of factors associated with placement of a product in an entertainment segment may provide a consistent and dependable evaluation of branding that can be used by marketers and networks as a standard for determining pricing for this product exposure.

Many factors may be used in determining the value of a product or logo placed in programming. The size of the product on the screen, legibility of the logo, lighting of the product, how long it is shown in the screen, whether the product in used by a character in the programming and whether the character discusses the product may all be factors in determining the value of a specific product placement.

While the words "television" and "screen" may be used in the following examples, this disclosure applies to many different kinds of content dissemination techniques. Examples include cable, satellite, internet applications such as YouTube, Hulu.com and ABC.com, mobile applications, movie theaters with interactive features, airline inseat media presentation and music videos among others as well as audio applications such as broadcast radio or satellite radio.

Branding, brand placement, logo placement or product placement may be used interchangeably here and for the purposes of this disclosure will be defined as the placement of any audio or visual presence of a commercial product in an entertainment segment for monetary or other consideration for the purpose of exposing the product to viewers of the entertainment segment. An entertainment segment may be any program directed to viewers such as dramas, comedies, contests, documentaries, news programs or any other such media presentations. Value, valuation, classification and evaluation may apply to a price or monetary value but also encompasses value in terms of impact and impression branding makes on viewers.

DESCRIPTION

Figure 1:
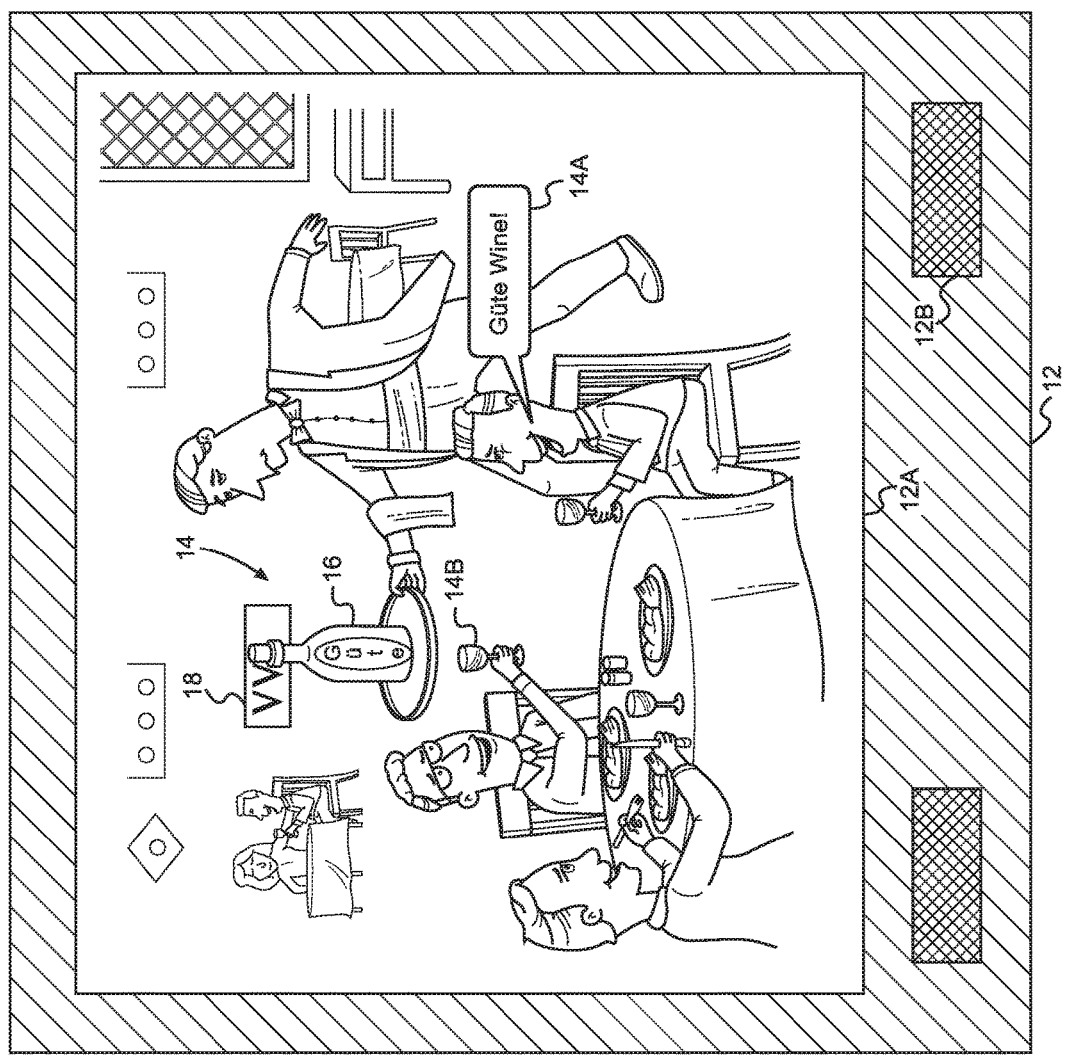
FIG. 1 is a depiction of a segment of programming with branding.

FIG. 1 is an example of programming that may be developed for viewer entertainment. In this example the programming may employ various props, sets, actors and venues to support a plot and script. Actors may employ dialog and body language to act out the story in the script. In FIG. 1 three actors are eating a meal at a table in the setting of a restaurant. A waiter is delivering wine to the table. One actor is holding up a glass of wine and another actor is speaking. Background features are visible.

FIG. 1 may also comprise a branding system 10 including a television 12 with a screen 12A, primary branding or product placement 14 of a commercial product 16 shown here as a bottle of "Güte" wine. Screen 12A also shows secondary branding 14A as a Güte wine comment and 14B as a glass of Güte wine. Also shown is a tertiary branding 18 shown as an image of a VW logo in the background partially obscured by primary branding 14. Viewer exposure to one or more of primary branding 14, secondary branding 14A and 14B, and tertiary branding 18 may influence viewers to buy Güte wine or to buy a VW car or it may influence the viewer's association or impression of these products.

Evaluating the value of branding may require different measures than are used for evaluating the value of a standard advertising segment or an advertising slot. Production of the advertising segment is typically controlled by the marketer and is inserted in a slot between entertainment segments. It may be valued primarily by factors including the number of viewers, the age of the viewers of an entertainment segment, the type of viewer and/or the length of the advertisement slot. Branding evaluation may involve additional factors such as audio visual attributes and integration factors that affect the value of specific branding.

Figure 2:
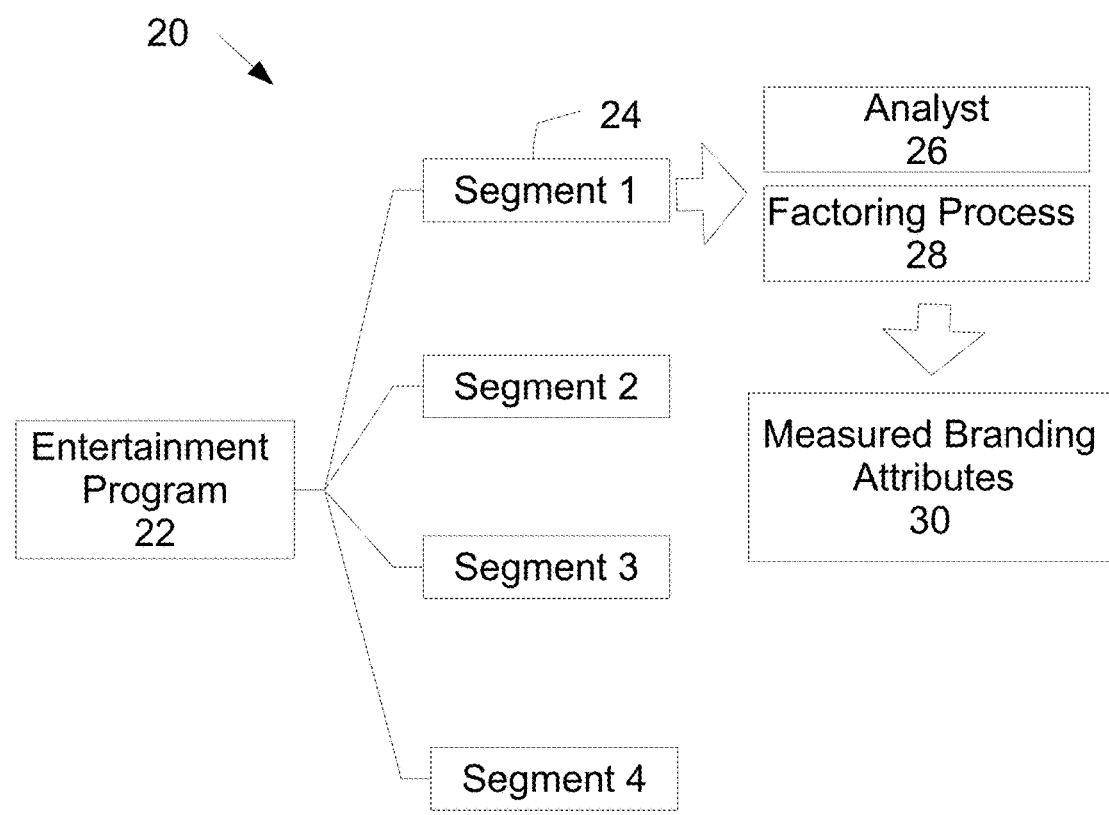
FIG. 2 is a chart illustrating segmenting of an entertainment program and a factoring function.

FIG. 2 is a process chart 20 that may represent a portion of branding system 10. Entertainment program 22 may initially be divided into blocks or segments 24. Segment or block 24 may be defined by scene changes, changes in product presentation, plot changes or other defining shifts in branded entertainment programming 22. A segment may be delineated such that each segment has substantially one audio visual branding attribute. Segments 24 may be further divided into subsegments such as audio segments and video segments. Each segment 24 may be classified and evaluated by an analyst 26 in a factoring process 28 to assign attribute values and derive critical parameters related to the value of the branding or presentation of the product during entertainment program 22. Analyst 26 may be a person or the functions of analyst 26 could be automated. For example, image recognition systems may be used to identify products on screen or to identify portions of the screens used as tags.

Figure 3:
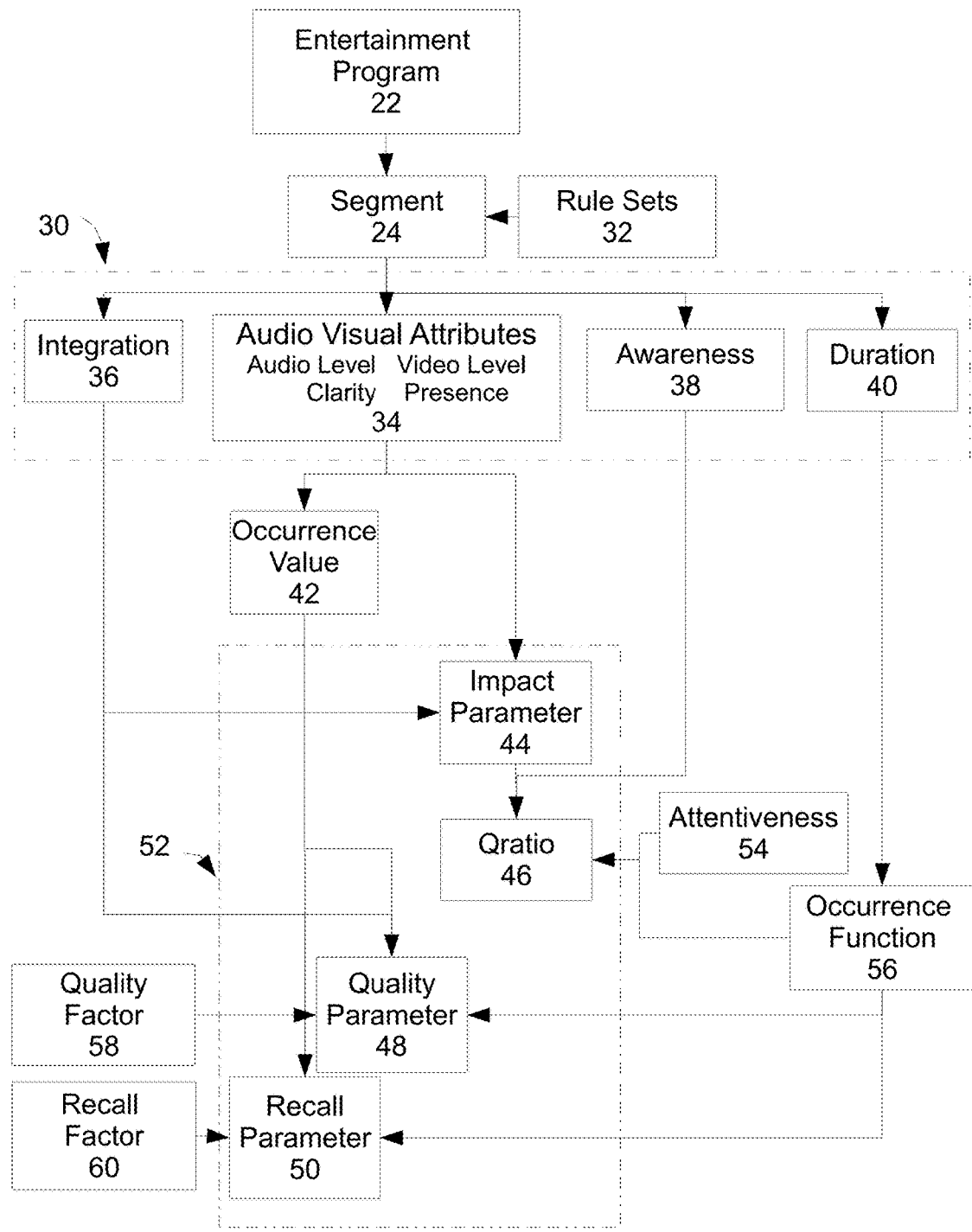
FIG. 3 is a chart illustrating variables, parameters and dependencies which may be used in evaluating branding.

FIG. 3 is a chart showing sources and dependencies for different variables. Entertainment program 22 is divided into segments 24 as described in FIG. 2. Analyst 26 in factoring process 28 may evaluate each segment for audio visual attributes 34 assigning level values based on elements and definitions of a rule set 32. Analyst 26 further evaluates integration 36 and awareness 38 based on elements described in additional rule sets and assigns awareness and integration values. A duration 40 of each segment is also recorded. Audio visual attributes 34, integration 36, awareness 38 and duration 40 may be considered measured branding attributes 30 as indicated by the dotted line box.

Factoring process 28 may generate an occurrence value 42 from the audio visual attributes. Occurrence value 42 may be a count of the number of segments at a level or may be a count of time periods at that level. For example, five segments may be assigned to a level and the occurrence value may be five. In an alternative configuration, a time period of five seconds may be defined. The five segments assigned to the level may be ten seconds each for a total of fifty seconds. This would then correspond to an occurrence level of ten occurrences.

Impact parameter 44 may be derived from the attribute values and integration values 36. A Qratio parameter 46 may be derived from impact parameter 44, awareness value 38, an attentiveness variable 54 and an occurrence function 56. Quality parameter 48 may be derived from occurrence values 42, occurrence function 56, integration values 36 and quality factors 58. Recall parameter 50 may be derived from occurrence values 42, integration values 36, recall factors 60 and occurrence function 56. Impact parameter 44, Qratio 46, quality parameter 48 and recall parameter 50 may be considered derived parameters 52 as indicated by the dotted line box. Attentiveness 54, occurrence function 56, quality factors 58 and recall factors 60 may be applied variables not dependent on segment measured variables. These applied variables may be determined separately from any specific entertainment segment 22.

Evaluating Branding Attributes

Audiovisual attribute 34 may be any product attribute as perceived by a viewer in segment 24. Audio visual attribute 34 may be defined by a rule set 32. Rule set 32 may define levels and each level may include an attribute value and a set of one or more level definitions or elements that differentiate characteristics of that level and delineates it from other levels. Factoring process 28 may use several rule sets 32.

TABLE 1

Audio Visual Attributes Rule Set

| Label | Audio Visual Attribute Elements [32A] | Attribute Value [32B] |
| --- | --- | --- |
| VL0 | None | 0 |
| VL1 | Background | 1 |
| VL2 | Background Close-up | 2 |
| VL3 | Foreground | 3 |
| VL4 | Foreground Closeup | 4 |
| VL5 | Hands-On | 5 |
| VL6 | Hands-On Close-up | 6 |
| VL7 | Implied Endorsement | 7 |
| VL8 | Custom Element | 8 |
| AL0 | None | 0 |
| AL1 | Verbal | 2 |
| AL2 | Verbal and Visual | 4 |

Table 1 shows an example visual attributes rule set that includes a label, audio visual attribute elements 32A and attribute values 32B. Visual level attribute elements 32A as shown in Table 1 may include "None," "Background," "Background Close-up," "Foreground," "Foreground Closeup Graphics," "Hands-On," "Hands-On Close-up," "Implied Endorsement," "Custom Element." These may be abbreviated references to more detailed definitions.

A "Background" level may indicate the product or logo is discernible in the background such as on a wall. With the "Background Close-up" level the product placement has clear logo identification, and is quite visible, though behind the main action on the screen.

At the "Foreground" level the main action on the screen takes place behind the product, or the camera moves in front of the product. The "Foreground Close-up" level may include a product shot (screen is focused almost exclusively on a product, as in a display of products) or the overlay of a logo on the screen (i.e. a sponsorship tag, an interstitial, a branded "call this number to vote" overlay).

A "Hands On" level may have the actors holding the product. This may include holding a beverage. "Hands On Closeup" may have the actors prominently displaying the product. This may include the actor drinking from the beverage with the logo prominently visible. For the level of "Implied Endorsement" the actor uses or interacts with the product. A lead actor driving an identifiable vehicle can fall under this category. A "Custom Element" may include a special tag or icon visible on the screen in addition to appearance of commercial product 16.

As an example of at least part of factoring process 28 and referring again to FIG. 1, "VW" logo 16 is in the background and partially blocked. It may be assigned a "None" visual level of VL0 and an attribute value 32B of zero. In a later segment logo 16 may not be obscured and it may be assigned or indexed to a "Background" visual level of VL1 and a attribute value 32B of one.

Branding 14 of FIG. 1 where the wine bottle with the product name or logo is clearly presented and centered on the screen in a separate segment by itself may be assigned or indexed to a level of VL4 and an attribute value 32B of four. Branding 14B in a separate segment by itself where the glass of wine is a prominent focus may be assigned a "Hands-On" level of VL5. When two or more types of branding for a single vendor are combined in a scene such as that shown in FIG. 1, a higher video and/or audio level may be assigned.

Audio attributes may also be related to what a viewer hears during segment 24 in relation to a product as noted by labels AL0 and AL1. Referring again to Table 1, audio levels may be limited to no audio AL0, audible reference to the product AL1. Additional level may be used than the examples shown here. Audible reference to the product while the product is visible may require an audio and visual level that may be labeled AL1+VLx.

For example, referring again to FIG. 1, secondary branding 14A where a customer is extolling the virtues of the product in a separate segment by itself may be assigned an audio level of AL1. Secondary branding 14A together with primary branding 14 as shown may be assigned a level of AL1+VL4 for an attribute value 32B of six.

Audio and/or visual attributes may include or may be modified by presence and clarity. Presence is the degree to which a product or brand is viewed in comparison to the amount and type of environmental clutter than surrounds it. It may also reflect the brand's "share of voice" on screen. Clarity is a product's visual and audio intelligibility based on clearness and lucidity in a scene.

A bottle of beer as the only product in an actor's hand may indicate high presence. The same bottle strategically positioned on top of the refrigerator with other products present may indicate an average presence. The same bottle of beer on a refrigerator shelf in a supermarket with many other beers may indicate a low presence.

Clarity and presence may have rule sets with values and elements and definitions. Clarity and presence values may be assigned to segment 24 as part of factoring process 28. Values for clarity and presence may be limited to zero and minus one. Good clarity and/or presence may have a zero value. Poor clarity and/or presence may decrement the audio visual attribute value by one. Other value sets for presence and clarity may be used.

Awareness 38 may be related to the association of the product with a primary character or on-screen persona. Product 16 held by a well known star or primary character may have a much higher awareness rating than product 16 held by a walk-on character that may not be recognized by a viewer. Awareness 38 may be governed by a rule set 32 that includes levels, level values and classifications, definitions and/or elements differentiating and delineating that level.

As an example, in FIG. 1 the character holding the wine glass and discussing product 16 may generate a higher awareness value than the VW logo separate from the primary characters. Awareness 38 may be a factor on the order of 0.8 to 1.5 and may be used as a factor for other derived parameters as described below.

Integration 36 may reflect the depth in which a brand is woven into the story arc or inclusion of the product with video continuity and content. The deepest integrations which communicate brand features and attributes have the greatest potential to influence the viewer. For example a movie with a plot involving stealing Ferrari automobiles may have a higher value for integration 36 for the Ferrari product than another movie which is a love story and a character drives a Ferrari automobile. Integration 36 may be governed by a rule set 32 that includes levels, level values and classifications, definitions and/or elements differentiating and delineating that level.

Awareness 38 and integration 36 may be interdependent between sequential segments 24. Where the awareness value is high in a first segment, the following segment may have an increased integration value as a result.

In another example, in FIG. 1 the wine glass and wine is more integrated into the programming continuity and content than is the VW logo in the background. The wine may be indexed to a higher integration value than the VW logo would be. Integration values may fall between 1 to 200 and there may be ten levels.

Attentiveness may be related to the portion of viewers that are actively following a broadcast. For a commercial network TV broadcast a reasonable estimate is that approximately 62% of viewers are paying attention to the broadcast. For a pay-cable broadcast the number the number of viewers paying attention may be approximately 80% and for a movie theater the viewer portion may be close to 99%. For commercial television the number of viewers viewing a commercial break may be 33%. If during the same show, there is a product placement, the portion of viewers that will be exposed to the product may be assumed to be all attentive viewers or 62%.

Attentiveness in relation to product placement may be expressed as a ratio of the number of viewers with attention to the screen during the appearance of the product to the number of viewers that would be watching a commercial segment that may be placed after the entertainment segment with the product placement.

As an example, 62% of viewers may be exposed to branding in an entertainment segment. During a commercial break in the same program 33% of viewers may be attentive. Attentiveness to branding would then be equal to 0.62/0.33 or 1.87.

The base value for attentiveness may change over time as viewer habits change. Should only 25% of viewers view commercial segments in a program while 62% view branding in a program, the attentiveness number for a product placement would instead be 2.48.

Alternatively, the base value for attentiveness may be based on a different set of factors than the example above. For example, a value for the proportion of viewers watching a commercial may be based on eye movements of a set of viewing subjects. Any substantive indication of commercial viewers may be used to determine a base value.

Duration 40 again represents the number of measured seconds in segment 24.

Figure 4:
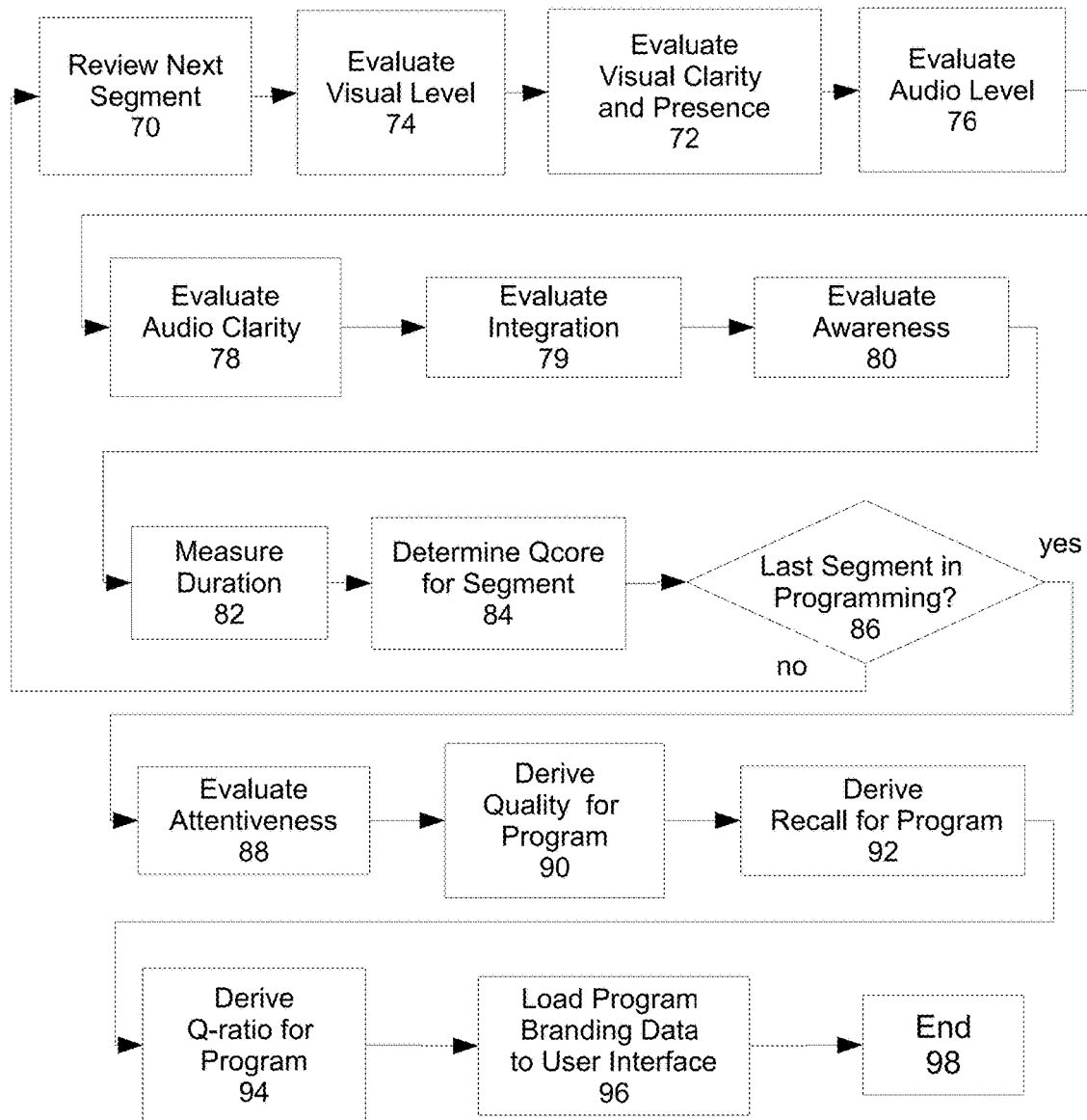
FIG. 4 is a flow chart of steps for deriving variables and parameters.

FIG. 4 is a flow chart representing one example of factoring process 28 and derivation of quality, recall and qratio parameters. In step 70 a first or next segment 24 is selected for review. In step 72 visual level of the branding is evaluated and in step 74 the visual clarity and presence are evaluated. In step 76 audio level is evaluated and in step 78 the audio clarity is evaluated. In step 79 integration 36 is evaluated. In step 80 awareness 38 is evaluated. In step 82 duration 40 of the segment is determined.

A qcore parameter for segment 24 may be derived in step 84. In step 86 if current segment 24 is not the last segment, control returns to step 70 and a new segment is evaluated. If it is the last segment, control moves out of the loop and attentiveness is evaluated at step 88. Parameter values for quality, recall and qratio for entertainment program 22 as a whole are derived in steps 90, 92 and 94. In step 96 evaluated attribute values and derived parameters and data are loaded to a user interface program and the process ends at step 98. The set of segments 24 evaluated typically comprises an entertainment program 22.

Deriving Parameters

Figure 5:
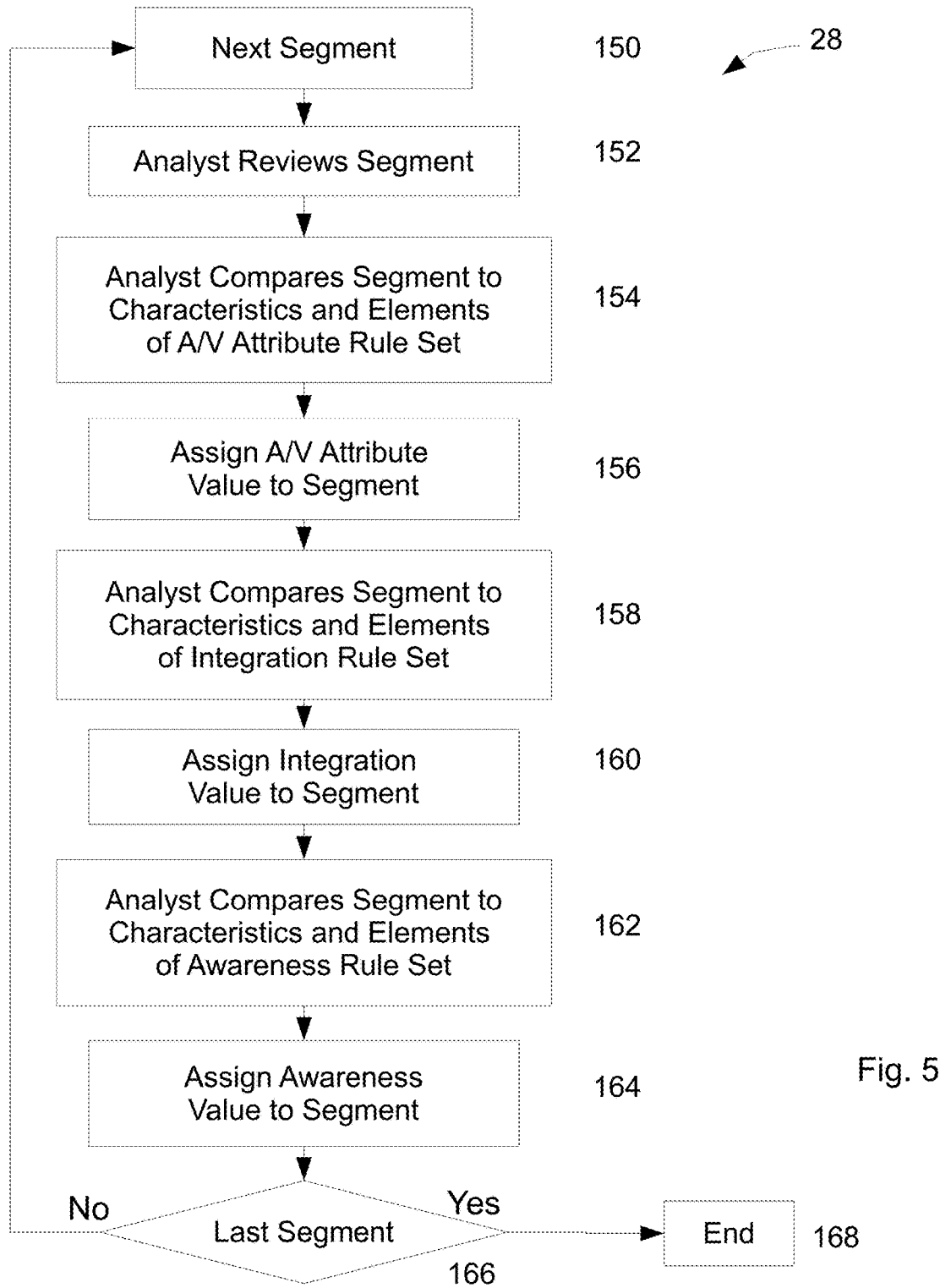
FIG. 5 is a flow chart of steps for deriving attribute values, awareness values and integration values from a segment.

FIG. 5 is a flow chart showing example steps in attribute evaluation and assigning attribute values to a segment 24. In step 150 the next segment in a series of segments from entertainment program 22 is viewed by analyst 26. Analyst 26 reviews the segment at step 152 and determines attributes of product 16 which appears in the segment. Analyst 26 may use a rule set 32 that includes audio visual attribute elements as illustrated in Table I. In step 154 analyst 26 may compare the listed characteristic attribute elements to the audio visual or branding elements of product 16 embedded in segment 24 In step 156 analyst 26 may determine or index a level for the segment most closely aligned to the elements 32A in the attribute rule set and assign the attribute value 32B of that level to the segment.

Analyst 26 may have similar rule sets for integration attributes and in step 158 may compare the listed integration elements to the elements of product 16 displayed in segment 24. In step 160 analyst 26 may determine or index a specific level for integration 36 for the segment that most closely aligned to the elements in the integration rule set. Analyst 26 may have similar rule sets for awareness 38 elements and in step 162 may compare the listed characteristic awareness elements to the elements of product 16 displayed in segment 24. In step 164 analyst 26 may determine or index an awareness level for the branding attributes of the segment most closely aligned to the elements in an awareness rule set. In step 166 if the current segment is the last segment then the process ends at step 168, else flow returns to step 150 to get the next segment.

Figure 6:
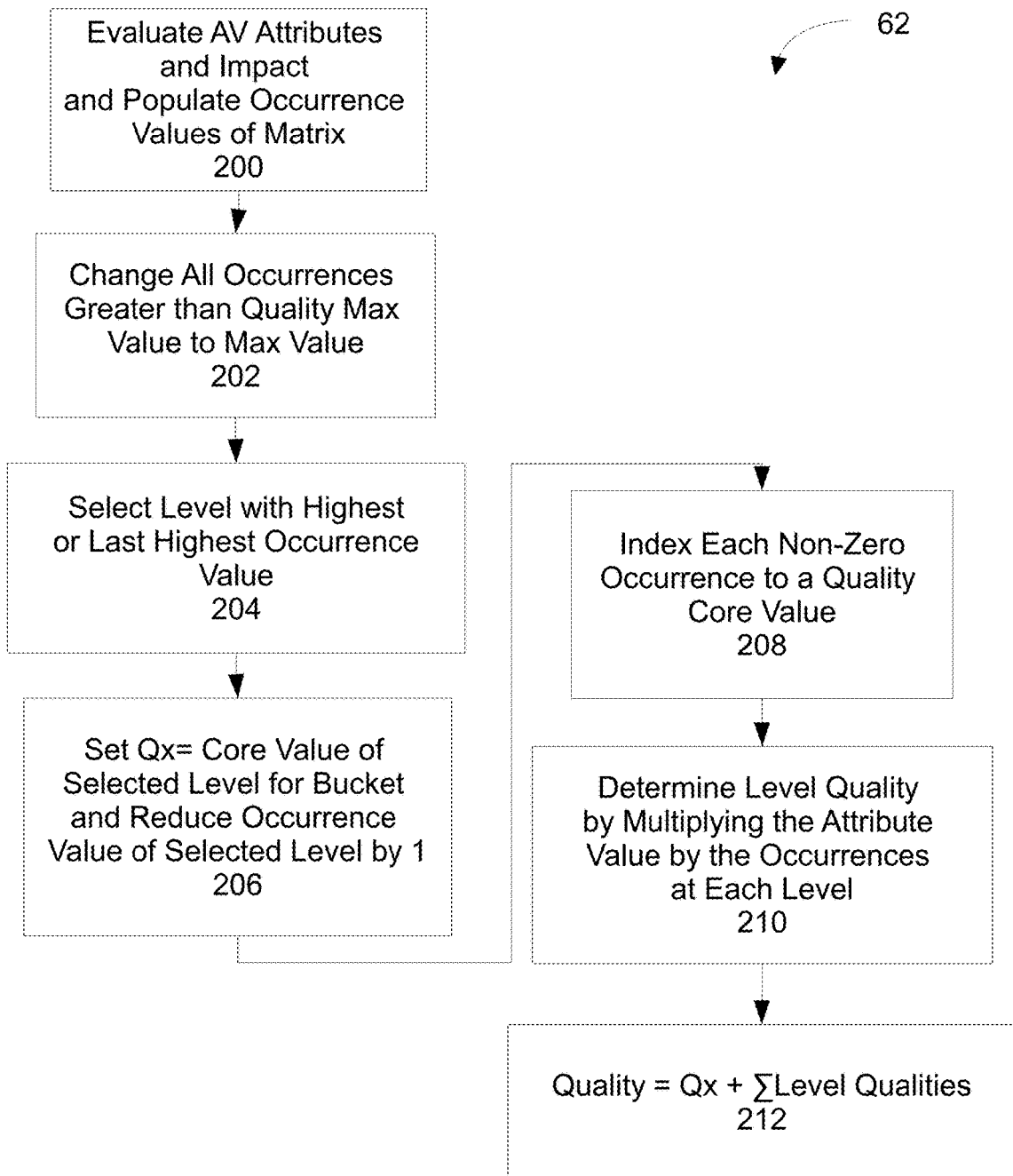
FIG. 6 is a flow chart of steps for deriving a quality parameter.

FIG. 6 is a flow chart of steps in deriving a value for quality parameter 48 as indicated in block 90. In step 200 a quality reference table or quality matrix may be used. Table 2 is an example of a quality matrix. The quality matrix may include quality factors 58 such as core quality, attribute quality and max count. These values may be developed independently from any entertainment program 22.

Analyst 26 may view each of segments 24 and evaluate audio and visual levels for each segment of program 22 as described in FIG. 5. After all segments 24 of program 22 are evaluated, the occurrence value 42 which reflects the total number of occurrences or counts of segments at each level are recorded in the second column of the quality matrix of Table 2. The third, fourth and fifth columns as shown list example core values, attribute values and max values. Where VL4 has a number of occurrences of two, this indicates two segments of the entertainment program had branding with audio visual attribute elements 32A of "Foreground Close-up."

In step 202 the occurrence values 42 in column 2 may be compared to the max values. Any occurrence value greater than the max value may be changed to the max value as noted. In step 204 the highest occurrence value in column 2 is selected. In block 206 variable Qx is assigned the core value for that level and the selected occurrence value is then decremented by one. In block 208 each non-zero occurrence value is indexed to the quality attribute value for that level. In block 210 the sum of the product of the occurrence value and the quality attribute value for each level is derived. In block 212 the program quality parameter 48 is derived by adding the Qx value to the sum of the products.

As an example, and using the example values shown in Table 2, columns 1 and 2 may comprise a histogram of the quality matrix. The second column may indicate the number of occurrences for that level. The maximum occurrence value is 5 for level AL1+VL2. The core value 27 is assigned to Qx. The 5 occurrences are now decremented to 4 occurrences. The sum of the products will be 2×0.1+1×0.3+2× 0.1+2×1.8+1×0.5+3×3.4+4×3.4+2×4.1+2×5.0+1×3.8=50.6. Adding Qx to this gives a value for quality parameter 48 of 77.6. These values are examples for the purpose of illustration and other values may be used and still fall within the scope of this disclosure.

Quality may further be a function of integration. The sum of the products may be multiplied by an integration value.

TABLE 2

Quality Matrix for Deriving Quality Parameter

| Label | No. Level Occurrences | Quality Core Value | Quality Attribute Value | Quality Max Value |
|---|---|---|---|---|
| VL0 | 0 | 0 | 0 | 0 |
| VL1 | 2 | 2 | 0.1 | 20 |
| VL2 | 1 | 3 | 0.3 | 10 |
| VL3 | 2 | 10 | 0.1 | 20 |
| VL4 | 2 | 18 | 1.8 | 5 |
| VL5 | 1 | 20 | 0.5 | 10 |
| VL6 | 0 | 30 | 3 | 5 |
| VL7 | 0 | 20 | 0.5 | 10 |
| VL8 | 0 | 25 | 0.6 | 10 |
| AL1 + VL0 | 0 | 25 | 3.1 | 0 |
| AL1 + VL1 | 3 | 27 | 3.4 | 0 |
| AL1 + VL2 | 5 | 27 | 3.4 | 0 |
| AL1 + VL3 | 0 | 33 | 3.8 | 0 |
| AL1 + VL4 | 2 | 33 | 4.1 | 0 |
| AL1 + VL5 | 0 | 35 | 4.4 | 0 |
| AL1 + VL6 | 2 | 40 | 5 | 0 |
| AL1 + VL7 | 1 | 30 | 3.8 | 0 |
| AL1 + VL8 | 0 | 40 | 5 | 0 |

Values used in the quality matrix, more specifically core, max and attribute values may be derived from one or more external sources. Possible sources may include market studies, focus groups, customer surveys and psychology studies. Commercial product owners may specify values to be used in the matrix.

One value of audio level AL1 is used in Table 2 and may be essentially binary, a verbal reference or no verbal reference. In some matrix configurations more audio levels may be used and another set of levels would be included.

Alternatively or in addition, rather than the number of occurrences being multiplied by a quality attribute value, the quality attribute value may be represented by a function. Any of various linear or non-linear functions may be used. Use of a declining function may reflect that a viewer seeing a logo one time may have a significant impact on the viewer. Seeing the logo for the hundredth time may have a minimal impact.

Figure 7:
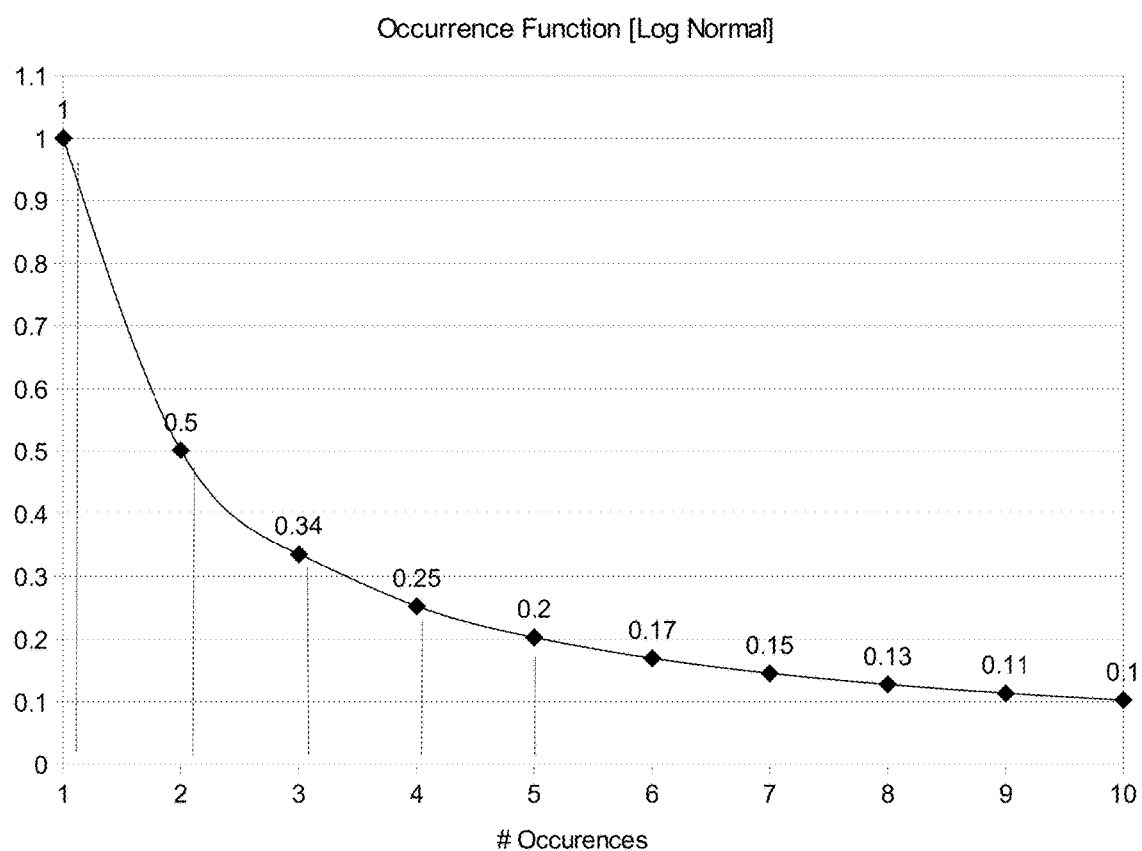
FIG. 7 is an example of an occurrence function.

FIG. 7 shows an example log normal declining value function that may be used in deriving a value. Occurrence function 56 may reflect the declining impact branding may have on viewers over longer durations or over repeated occurrences. Occurrence function 56 may be any mathematical function or assigned values. Here occurrence function 56 is shown as a declining log normal function.

Figure 8:
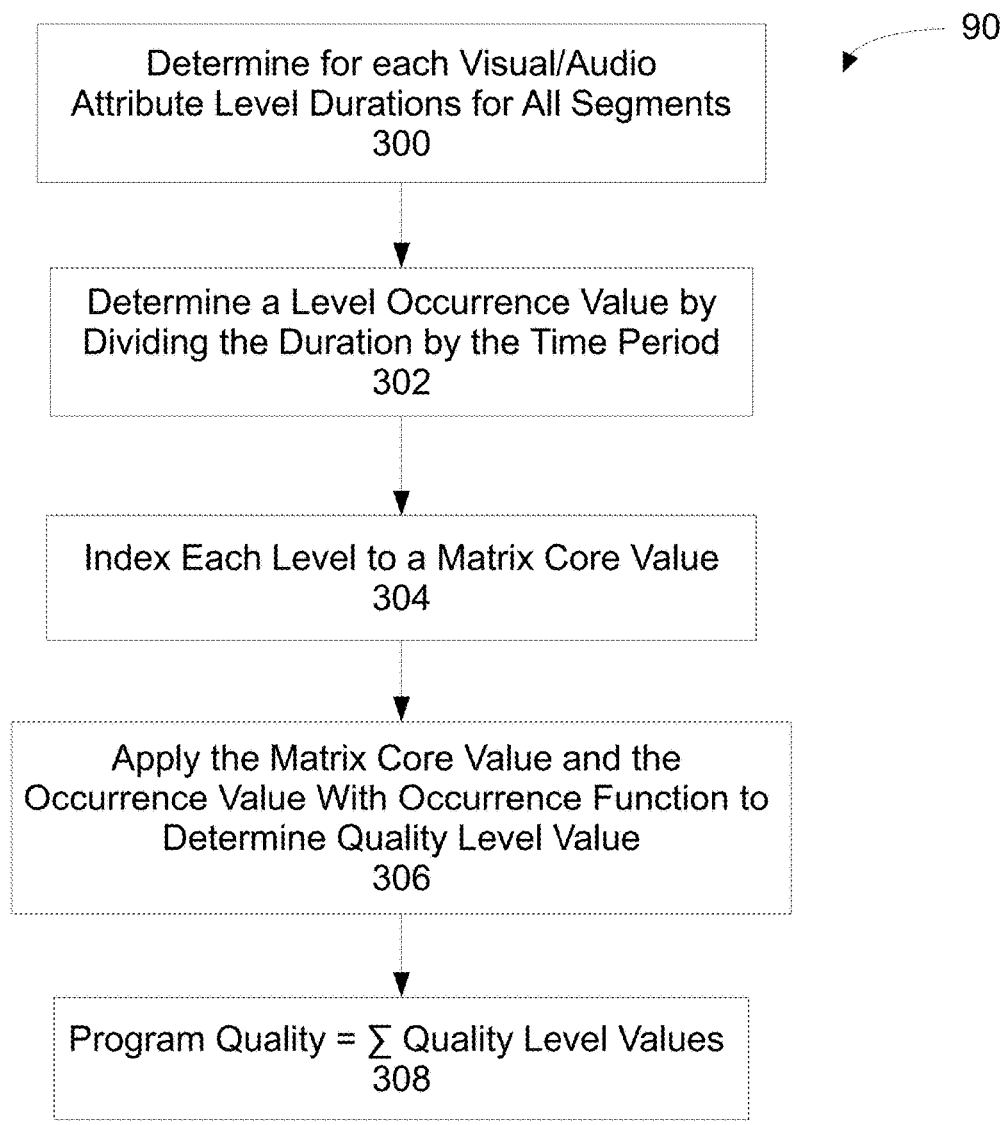
FIG. 8 is a flow chart for deriving a quality parameter using an occurrence function.

FIG. 8 is a flow chart of an alternative method for deriving a value for quality parameter 48 to that in FIG. 6. Here an occurrence function 56 is used together with an alternative algorithm. In step 300 a matrix is developed using occurrence value 42 of levels and occurrences for all segments. Here the occurrence value 42 may be derived differently. Here rather than the number of segments, At step 302 the number of occurrences at each level is determined using a number of time periods in a segment. For example, one branding event at level VL4 that lasts for 20 seconds where the defined time period is ten seconds may count as two occurrences. One branding event lasting less than the defined time period may be rounded up to a value of one occurrence. The matrix developed here may be similar to Table 2 with an occurrence value for each level.

At step 304 a quality core value is indexed at each level with a nonzero occurrence in the matrix. At step 306 a quality value is determined for each level using occurrence function 56. For example, using the occurrence value of 5 from Table 2 and using values of one through five shown on the occurrence function 56 of FIG. 7. The level quality value may be derived by summing the values of occurrence function 56 at 5 values of 1, 2, 3, 4 and 5 or 1.0+0.5+0.34+ 0.25+0.2 equal to 2.29 and then multiplying that value by the core value of 27. At step 308 the value for quality parameter 48 is determined by summing the level quality values.

Deriving a value for quality parameter 48 may include a combination of the methods and steps described in FIGS. 6 and 8. For example, determining level quality for levels VL0 through VL6 may use a declining quality function as described in FIG. 8 while levels VL7, VL8 and AL1+VL0 through AL1+VL8 may use the core value plus attribute value method as described in FIG. 6.

Recall parameter 50 may relate to the ability of a viewer to remember the embedded commercial product after viewing branding. Recall 50 may be derived using methods similar to methods used to calculate quality parameter 48. Recall parameter 50 may use a different set of factors 60 in the matrix. A typical recall matrix is shown in Table 3. The occurrence values shown in column 2 for this example are the same occurrence values in the quality matrix of Table 2.

TABLE 3

Recall Matrix for Deriving Recall Parameter

| Label | No. Level Occurrences | Recall Core Value | Recall Attribute Value | Recall Max Value |
|---|---|---|---|---|
| VL0 | 0 | 0 | 0 | 10 |
| VL1 | 2 | 0.5 | 0 | 10 |
| VL2 | 1 | 1 | 0 | 10 |
| VL3 | 2 | 1.5 | 0 | 10 |
| VL4 | 2 | 3 | 0 | 10 |
| VL5 | 1 | 4 | 0 | 10 |
| VL6 | 0 | 6 | 0 | 10 |
| VL7 | 0 | 3.5 | 0 | 10 |
| VL8 | 0 | 5 | 0 | 10 |
| AL1 + VL0 | 0 | 7.5 | 0 | 10 |
| AL1 + VL1 | 3 | 8 | 0 | 10 |
| AL1 + VL2 | 5 | 8 | 0 | 10 |
| AL1 + VL3 | 0 | 8.5 | 0 | 10 |
| AL1 + VL4 | 2 | 9 | 0 | 10 |
| AL1 + VL5 | 0 | 10 | 0 | 10 |
| AL1 + VL6 | 2 | 12.5 | 0 | 10 |
| AL1 + VL7 | 1 | 10 | 0 | 10 |
| AL1 + VL8 | 0 | 12.5 | 0 | 10 |

Figure 9:
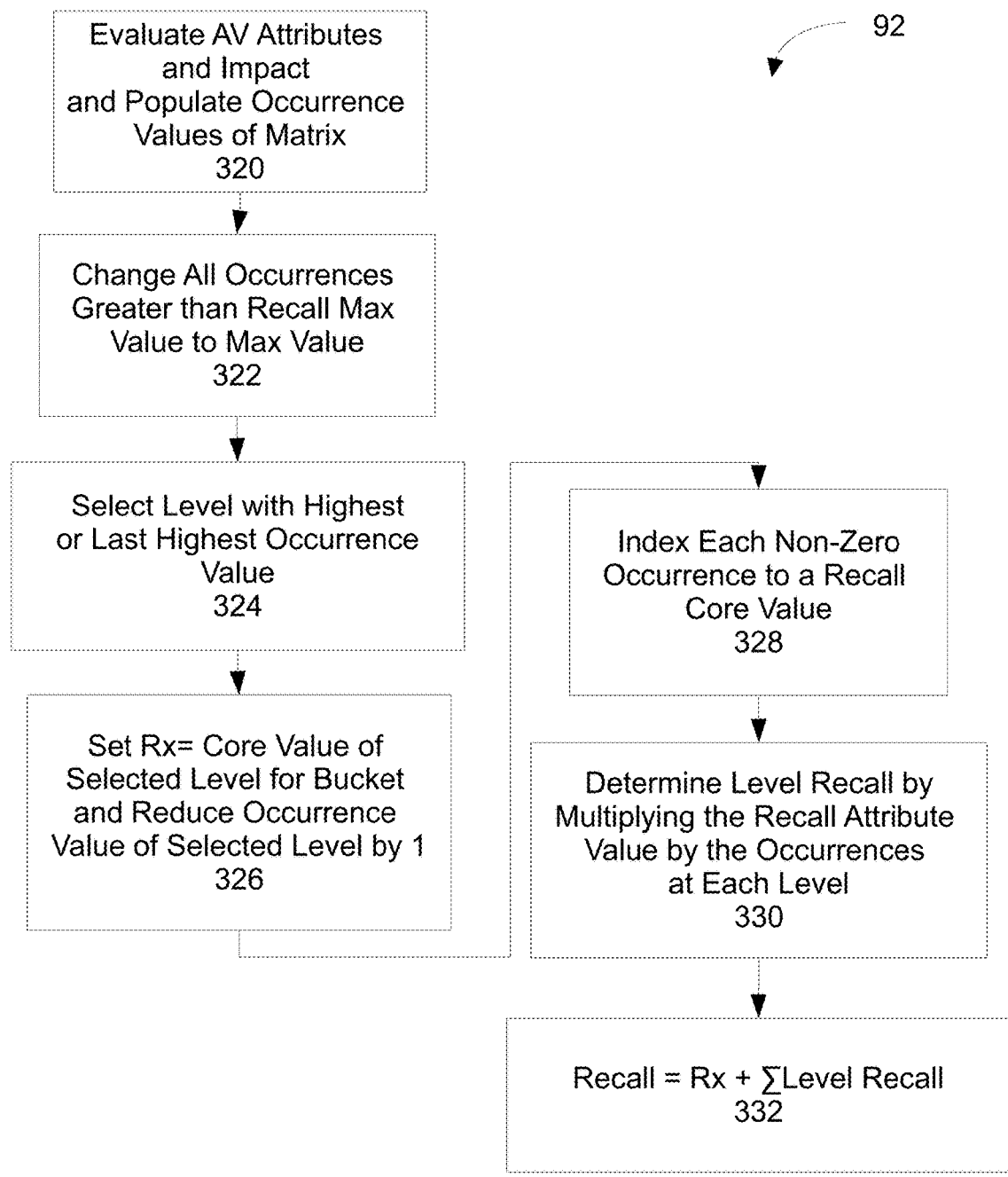
FIG. 9 is a flow chart of steps for deriving a quality parameter.

FIG. 9 is a flow chart of steps in deriving a value for recall parameter 48 as indicated in block 92. In step 320 a recall reference table or recall matrix may be used. Table 3 is an example of a recall matrix. The recall matrix may include recall factors 60 such as core quality, recall attribute and max count. These values may be developed independently from any entertainment program 22.

Analyst 26 may view each of segments 24 and evaluate audio and visual levels for each segment of program 22 as described in FIG. 5. After all segments 24 of program 22 are evaluated, the occurrence value 42 which reflects the total number of occurrences or counts of segments at each level are recorded in the second column of the recall matrix of Table 3. The third, fourth and fifth columns as shown list example core values, recall attribute values and max values.

In step 322 the occurrence values in column 2 may be compared to the max values. Any occurrence value greater than the max value may be changed to the max value as noted. In step 324 the highest occurrence value in column 2 is selected. In block 326 variable Rx is assigned the core value for that level and the selected occurrence value is then decremented by one. In block 328 each non-zero occurrence value is indexed to the recall attribute value for that level. In block 330 the sum of the product of the occurrence value and the recall attribute value for each level is derived. In block 332 the program recall parameter 48 is derived by adding the Rx value to the sum of the products.

As an example of deriving recall parameter 50, and using the methods and steps of FIG. 6 and still referring to the recall matrix of Table 3, where the second column is the number of occurrences for that level. The maximum occurrence value shown is five for level AL1+VL2. The core value 8 is assigned to Rx. The five occurrences are now decremented to four occurrences. The sum of the products in this case where the attributes are all zero will be zero. Adding Rx to this gives a recall parameter value of eight. These values are examples for the purpose of illustration and other values may be used and still fall within the scope of this disclosure. Recall may further be a function of integration. The recall parameter may be multiplied by an integration value.

In an alternative configuration, a recall parameter using occurrence function 56 may be derived. using steps similar to those of FIG. 8.

Recall factors 60 used in the recall matrix, more specifically core, max and attribute values may again be derived from one or more external sources. Possible sources may include market studies, focus groups, customer surveys and psychology studies. Product owners may specify values to be used in the matrix of Table 3.

It may be preferable in defining quality factors 58 or recall factors 60 that the derived parameter for a set of segments with three occurrences of a VL3 level be approximately equal to the derived parameter for a set of segments with one VL2 occurrence, one VL3 occurrence and one VL4 occurrence. This may be a function of a declining function and associated values and/or values of the associated matrix.

Deriving program recall parameter 50 may include a combination of methods. For example, recall for levels VL0 through VL6 may use a declining recall function as described in FIG. 8 while levels VL7, VL8 and AL1+VL0 through AL1+VL8 may use the core value plus attribute value method described in FIG. 9.

One audio level is shown in Table 3 and may be essentially binary, a verbal reference or no verbal reference. In alternative configurations more audio levels may be used and another set of levels would be included in the matrix of Table 3.

Figure 10:
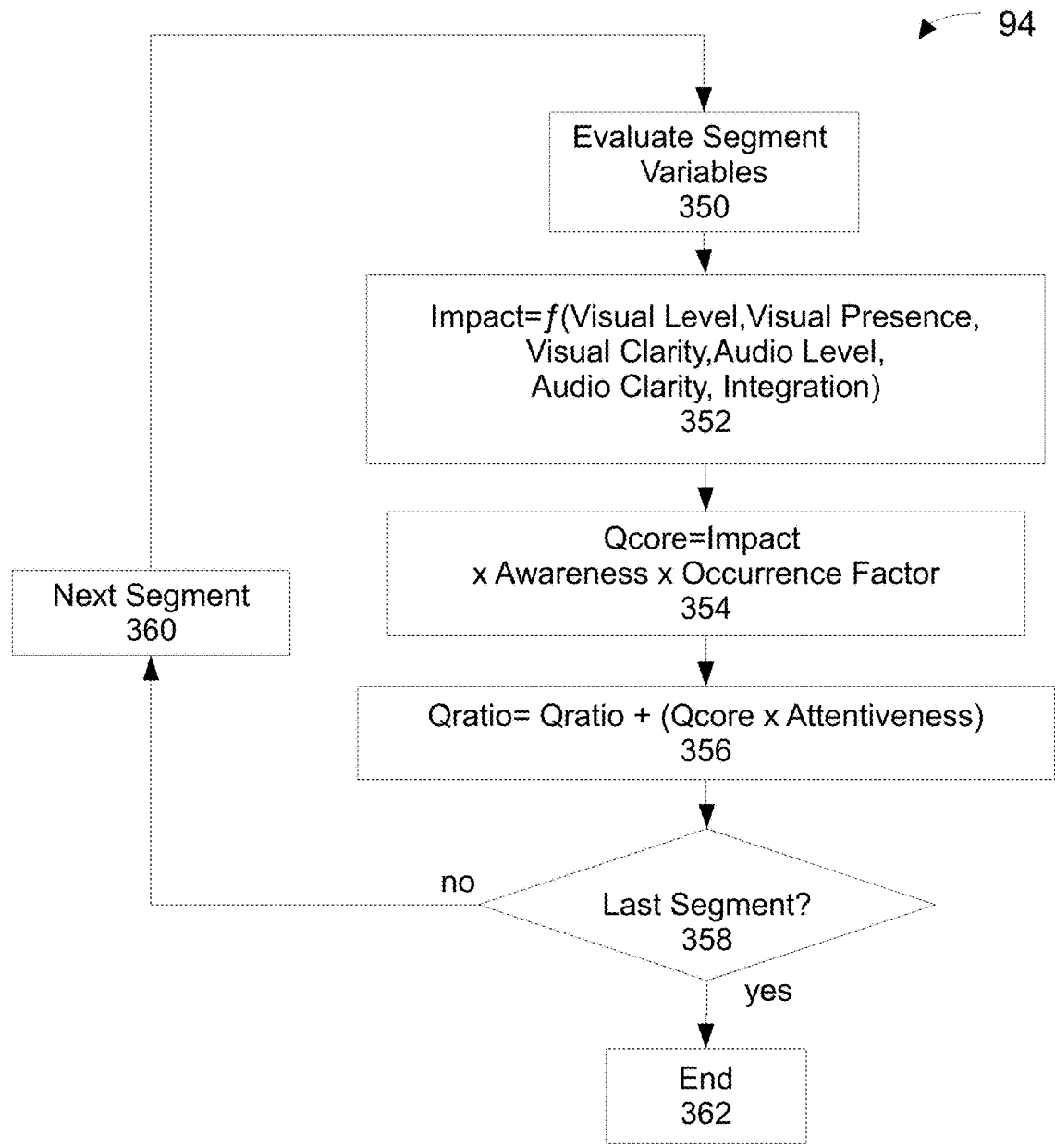
FIG. 10 is a flow chart for deriving a qratio parameter.

FIG. 10 is a flow chart describing derivation of Qratio 46 as noted in steps 84 and 94 of FIG. 4. In step 350 parameters for selected segment 24 are evaluated. In step 352 impact 44 is derived as a function of the segment attributes of visual level, visual presence, visual clarity, audio level, audio clarity and integration. Impact parameter 44 may be derived in step 352 by summing values of the visual level, visual presence, visual clarity, audio level, audio clarity and integration. Alternatively, impact parameters 44 may be derived in step 352 using another function such as summing visual level, visual presence, visual clarity, audio level and audio clarity and multiplying the sum by integration 36. Impact 44 may reflect a base-line level of quality by biasing every branded second based on an endorsement level. For example, three seconds of passive background placement is worth a fraction of a three second verbal endorsement of a brand.

In step 354 the qcore value for segment 24 may be derived by multiplying impact 44 by awareness 38 and occurrence function 56. Occurrence function 56 may be similar to that used in deriving quality and recall parameters. Occurrence function 56 may be a declining function and may reflect the impact of branding on a viewer over a longer period of time. Occurrence function 56 may be any linear or non-linear function.

Qratio 46 for program 22 is updated by adding the qcore value for the segment multiplied by attentiveness to the current value for the program Qratio 46 in step 356. In step 358 if the current segment is the last segment, control passes to step 360 and the method ends at step 362. If in step 358 the current segment is not the last segment, the next segment 24 is selected at step 360 and control returns to step 350. Again, the set of segments 24 evaluated may correspond to an entertainment program 22.

Qratio 46 may be applied as a valuation multiple (currency) which reflects the brand exposure impact on an average viewer of a brand placement. Qratio 46 may be applied to a base value such as an advertising segment price to derive a monetary value for the brand placement. This process may provide a cross comparison between branded entertainment value exposure regardless of the venue. (TV, Sports Film, Web-Video, etc).

Figure 11:
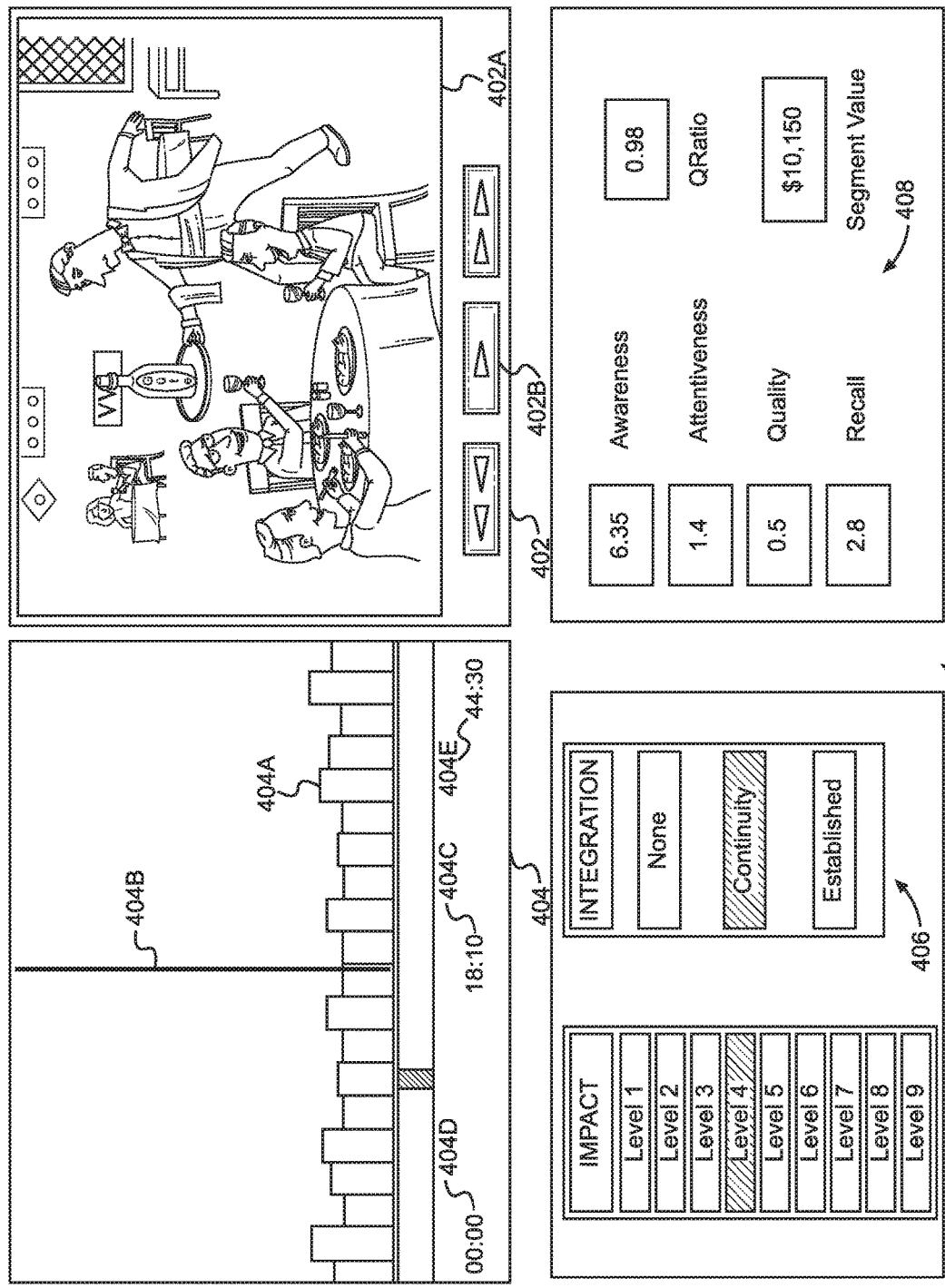
FIG. 11 is an example web page with branding evaluation data.

FIG. 11 is a web page 400 displaying branding evaluation data for a commercial product as may be acquired using branding evaluation steps described above. Replay section 402 of web page 400 is shown as a display that replays segments 24 of entertainment program 22 showing in part an embedded commercial product. Section 402 is shown including a screen 402A and controls 402B for replay, fast forward and fast reverse of the segment replay.

Web page 400 further includes monitor section 404. Monitor section 404 is shown with a set of scrolling blocks 404A with sizes reflecting segment duration (width) and attribute value (height), Monitor section 404 further includes an index marker 404B of the current playing segment that remains stationary as the blocks scroll, a current time 404C for the elapsed time of the entertainment program and beginning time 404D and total time 404E for the displayed entertainment program 22.

Index marker 404B may indicate the block 404A currently playing in section 402 and the sequence of blocks 404A may show the sequence and order of segments in entertainment program 22.

Web page 400 further includes an icon data section 406. Icon data section 406 may display data related to the current section as labeled icons. Data displayed in this section may include audio visual attribute data related to the current segment being displayed in section 402.

Web page 400 further includes a quantitative data section 408. Quantitative data section 408 is shown displaying numeric fields with variable data and data labels. The numeric fields may update with new current data for the current segment where appropriate.

The described system and assemblies are examples and are not to be used as limitations. While wine has been used as a product example, any product or branding presented in this context may fall within the scope of this disclosure. Any suitable configuration or combination of components presented, or equivalents to them that perform a similar function falls within the scope of this disclosure.

This disclosure may include one or more independent or interdependent inventions directed to various combinations of features, functions, elements and/or properties, one or more of which may be defined in the following claims. Other combinations and sub-combinations of features, functions, elements and/or properties may be claimed later in this or a related application. Such variations, whether they are directed to different combinations or directed to the same combinations, whether different, broader, narrower or equal in scope, are also regarded as included within the subject matter of the present disclosure.

An appreciation of the availability or significance of claims not presently claimed may not be presently realized. Accordingly, the foregoing embodiments are illustrative, and no single feature or element, or combination thereof, is essential to all possible combinations that may be claimed in this or a later application. Each claim defines an invention disclosed in the foregoing disclosure, but any one claim does not necessarily encompass all features or combinations that may be claimed. Where the claims recite "a" or "a first" element or the equivalent thereof, such claims include one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

The invention claimed is:

1. A computer-implemented method for automatically evaluating branding of a commercial product in an entertainment program, the method comprising:
   segmenting, using a computer, the entertainment program into one or more blocks, each block comprising audio and video, the audio correlated with the video;
   generating, using the computer, a Graphical User Interface (GUI) comprising:
      a first portion displaying a sequence and order of the blocks in the entertainment program;
      a second portion displaying a scene from the entertainment program; and
      a third portion displaying a plurality of numeric fields;
   assigning, for each block of the one or more blocks, a branding level associated with the block by:
      determining, using the computer, an audio visual attribute value, the audio visual attribute value associated with the product in the block, the determination of the audio visual attribute comprising:
         identifying, using an image recognition system of the computer, one or more audio visual attribute elements in the block by analyzing the video of the block;
         comparing the identified audio visual attribute elements to predefined audio visual attribute elements of an audio visual rule set, the audio visual rule set comprising a set of associations between the predefined audio visual attribute elements and a plurality of audio visual attribute values;
         determining, based on the comparison, an audio visual attribute value of the plurality of audio visual attribute values associated with predefined audio visual attribute elements that align with the identified audio visual attribute elements; and
         assigning the determined audio visual attribute value to the block;

updating, using the computer, at least one of the plurality of numeric fields based on the determined audio visual attribute value;
determining, using the computer, an awareness value, the awareness value reflecting the association of the product with an in-screen persona;
updating, using the computer, at least one of the plurality of numeric fields based on the determined awareness value; and
generating, by the computer, the branding level for the block based on the determined audio visual attribute value and the determined awareness value; and
determining, using the computer, a value for the entertainment program based on the branding level associated with each block and a duration of each block.

2. The method for evaluating branding of claim 1, further comprising:
deriving, at the computer, a recall parameter associated with the ability of a viewer to remember the product.

3. The method for evaluating branding of claim 1, further comprising:
deriving, at the computer, a recall parameter as a function at least in part of:
a plurality of recall factors;
the number of blocks at an audio visual attribute value; and
an occurrence function.

4. The method for evaluating branding of claim 1, further comprising:
deriving, at the computer, a quality parameter as a function at least in part of:
a plurality of quality factors; and
the number of blocks at an audio visual attribute value.

5. The method for evaluating branding of claim 1, further comprising:
deriving, at the computer, a quality parameter as a function at least in part of:
a plurality of quality factors;
the number of blocks at an audio visual attribute value; and
an occurrence function.

6. The method for evaluating branding of claim 3, where the occurrence function is a log function.

7. The method for evaluating branding of claim 5, where the occurrence function is a log function.

8. The method for evaluating branding of claim 1, wherein the value for the entertainment program is a qratio value.

9. A host system with a computer processor configured to automatically execute a web server to provide a web page displaying a branding valuation report, the system comprising:
a non-transitory computer-readable data storage device storing:
at least a portion of an entertainment program with embedded branding of a commercial product and entertainment program content, the entertainment program segmented into a plurality of blocks; and
branding valuation data for the embedded branding, the branding valuation data comprising:
a value for the entertainment program based upon a combination of an awareness value associated with each block, an audio visual attribute value associated with each block, and a duration associated with each block,
the audio visual attribute value associated with the product in the block, the audio visual attribute value determined by:
identifying, with an image recognition system, one or more audio visual attribute elements in the block by analyzing the video of the block;
comparing the identified audio visual attribute elements to predefined audio visual attribute elements of an audio visual rule set, the audio visual rule set comprising a set of associations between the predefined audio visual attribute elements and a plurality of audio visual attribute values;
determining, based on the comparison, an audio visual attribute value of the plurality of audio visual attribute values associated with predefined audio visual attribute elements that align with the identified audio visual attribute elements; and
assigning the determined audio visual attribute value to the block; and
the awareness value associated with each block reflecting the association of the product with an in-screen persona;
a memory device storing code for the web server; and
the processor coupled to the data storage device and to the memory device, the processor configured to execute the code for the web server such that the web server is operable to:
receive a request for the web page from a web browser;
package the web page with the entertainment program and the branding valuation data for transmission to the web server; and
transmit the web page with the entertainment program and the branding valuation data to the web browser;
where the transmitted web page includes:
a first section that displays the entertainment program with embedded branding and icons for controlling playback;
a second section that displays at least part of the branding valuation data graphically; and
a third section that displays at least part of the branding valuation data numerically.

10. The host system of claim 9, where the web page further includes a fourth section that displays a representation of two or more of the plurality of blocks and an indication of a block of the plurality of blocks currently displayed in the first section.

11. The host system of claim 9, wherein the host system is further configured to derive an impact parameter for a block of the plurality of blocks as a function of the audio visual attribute value associated with the block.

12. The host system of claim 9, wherein the host system is further configured to derive a qratio value for the entertainment program as a function of the audio visual attribute values associated with the blocks.

13. The method of claim 1, wherein segmenting the entertainment program comprises receiving the entertainment program and an indication of the block boundaries.

14. A non-transitory computer-readable medium comprising instructions configured to cause one or more processors in a computer system to automatically perform a method, the method comprising:
segmenting, using the computer system, an entertainment program into one or more blocks, each block comprising audio and video, the audio correlated with the video;
generating, using the computer system, one or more of the blocks in a Graphical User Interface (GUI), the GUI comprising:

a first portion displaying a sequence and order of the blocks in the entertainment program; and a second portion displaying a scene from the entertainment program;

assigning, for each block of the one or more blocks, a branding level associated with the block by:

determining, using computer system, an audio visual attribute value, the audio visual attribute value associated with a product in the block, the determination of the audio visual attribute comprising:

identifying, using an image recognition system of the computer system, one or more audio visual attribute elements in the block by analyzing the video of the block;

comparing the identified audio visual attribute elements to predefined audio visual attribute elements of an audio visual rule set, the audio visual rule set comprising a set of associations between the predefined audio visual attribute elements and a plurality of audio visual attribute values;

determining, based on the comparison, an audio visual attribute value of the plurality of audio visual attribute values associated with predefined audio visual attribute elements that align with the identified audio visual attribute elements;

assigning the determined audio visual attribute value to the block;

determining, using the computer system, an awareness value, the awareness value reflecting the association of the product with an in-screen persona; and generating, at the computer system, the branding level for the block based on the determined audio visual attribute value and the determined awareness value; and determining, using the computer system, a value for the entertainment program based on the branding level associated with each block and a duration of each block.

15. The non-transitory computer-readable medium of claim 14, wherein segmenting the entertainment program comprises receiving the entertainment program and an indication of the block boundaries.

16. The non-transitory computer-readable medium of claim 14, wherein the value for the entertainment program is a qratio value.

* * * * *